(12) United States Patent
Schreiber et al.

(10) Patent No.: US 9,992,465 B1
(45) Date of Patent: Jun. 5, 2018

(54) VEHICULAR NAVIGATION SYSTEM UTILIZING A PROJECTION DEVICE

(71) Applicants: Hyundai Motor Company, Seoul (KR); Hyundai America Technical Center, Inc, Superior Township, MI (US); Hyundai Motor Europe Technical Center GmbH, Russelsheim (DE); Kia Motors Corporation, Seoul (KR)

(72) Inventors: Michael Schreiber, Frankfurt am Main (DE); Nilesh Patel, Canton, MI (US); Stefan Lessmann, Frankfurt am Main (DE); Gregory Ardisana, Canton, MI (US); Amanda Christiana, Ann Arbor, MI (US)

(73) Assignees: Hyundai Motor Company, Seoul (KR); Kia Motors Company, Seoul (KR)

(*) Notice: Subject to any disclaimer, the term of this patent is extended or adjusted under 35 U.S.C. 154(b) by 0 days. days.

(21) Appl. No.: 15/427,451

(22) Filed: Feb. 8, 2017

(51) Int. Cl.
```
H04N 9/31      (2006.01)
G06F 3/01      (2006.01)
G06T 11/60     (2006.01)
G06K 9/00      (2006.01)
G01C 21/36     (2006.01)
G01C 21/34     (2006.01)
```
(52) U.S. Cl.
CPC .......... *H04N 9/3185* (2013.01); *G01C 21/34* (2013.01); *G01C 21/365* (2013.01); *G06F 3/011* (2013.01); *G06K 9/00476* (2013.01); *G06T 11/60* (2013.01); *H04N 9/3147* (2013.01); *H04N 9/3194* (2013.01)

(58) Field of Classification Search
CPC .. H04N 9/3185; H04N 9/3147; H04N 9/3194; G01C 21/34; G01C 21/365; G06F 3/011; G06K 9/00476; G06T 11/60
See application file for complete search history.

(56) References Cited

U.S. PATENT DOCUMENTS

| | | | |
|---|---|---|---|
| 2013/0321402 A1 | 12/2013 | Moore et al. | |
| 2015/0142248 A1* | 5/2015 | Han | G01C 21/3602 701/23 |
| 2015/0211877 A1* | 7/2015 | Laycock | G02B 3/14 701/444 |

FOREIGN PATENT DOCUMENTS

| | | |
|---|---|---|
| DE | 10034381 A1 | 1/2002 |
| DE | 102010010314 A1 | 9/2011 |

\* cited by examiner

*Primary Examiner* — Michael Teitelbaum
(74) *Attorney, Agent, or Firm* — Mintz Levin Cohn Ferris Glovsky and Popeo, P.C.; Peter F. Corless

(57) ABSTRACT

A method includes: receiving an indication of a destination from a user; determining a route from a current position of a vehicle to the destination; detecting whether the user has exited the vehicle; and projecting an image of the route from the current position of the vehicle to the destination onto ground nearby the vehicle using a projection device equipped in the vehicle, such that the projected image is viewable by the user upon exiting the vehicle, in response to detecting that the user has exited the vehicle.

20 Claims, 9 Drawing Sheets

VEHICULAR NAVIGATION SYSTEM UTILIZING A PROJECTION DEVICE

BACKGROUND (a) Technical Field

The present disclosure relates generally to vehicular navigation systems, and more particularly, to vehicular navigation systems utilizing a projection device.

(b) Background Art

Navigation systems are often used in conjunction with vehicular travel to direct a user of a vehicle (e.g., driver or passenger) to a destination selected by the user. For various reasons, however, the user may not always arrive at the exact location of the destination, leaving a distance remaining between the vehicle and the destination that the user must walk. For example, if a user drives a vehicle to a restaurant, shop, theater, or the like, and the user is required to park the vehicle, there will be a distance remaining between the location of the parked vehicle and the destination. In another example, if a user takes a taxi to a destination, there will be a distance remaining between the location at which the user is dropped off and the destination. In yet another example, a user utilizing a ride sharing service may be transported to a drop off location and required to walk from there to a meeting point with friends.

In either scenario, the distance remaining between the vehicle from which the user exits and the destination may be significant depending on circumstances. Furthermore, the location at which the user exits the vehicle may be unfamiliar, and as a result, the directions from the vehicle to the destination may not be clear. This can ultimately hinder the user from reaching his or her destination.

SUMMARY OF THE DISCLOSURE

The present disclosure provides techniques for providing a user of a vehicle with a visual representation of directions to a destination on the ground nearby the vehicle, such that the representation is viewable by the user upon exiting the vehicle. The visual representation is produced using one or more projection devices equipped in the vehicle capable of projecting an image onto the ground in response to detecting that the user has exited the vehicle. The projected image may include a map showing the current location of the vehicle and the user's destination, as well as directions overlaying the map indicating a path for the user to follow while walking from the vehicle to the destination. The projected image may also be adjusted according to the detected position and/or orientation of the user, so information in the image is easily discernable. After being provided with directions from the current location of the vehicle to the destination upon exiting the vehicle, the user can find his or her way to the destination more quickly and reliably.

According to embodiments of the present disclosure, a method includes: receiving an indication of a destination from a user; determining a route from a current position of a vehicle to the destination; detecting whether the user has exited the vehicle; and projecting an image of the route from the current position of the vehicle to the destination onto ground nearby the vehicle using a projection device equipped in the vehicle, such that the projected image is viewable by the user upon exiting the vehicle, in response to detecting that the user has exited the vehicle.

The method may further include receiving the indication of the destination from the user via a navigation system equipped in the vehicle or a mobile device of the user that is communicatively coupled to the vehicle.

The projection device may be one of a plurality of projection devices equipped in the vehicle. In this regard, the method may further include: selecting which projection device of the plurality of projection devices to project the image; and projecting the image using the selected projection device. The method may also include: identifying which door of a plurality of doors of the vehicle has opened; and selecting which projection device of the plurality of projection devices to project the image based on the identified opened door. The method may further include: detecting a position of the user with respect to the vehicle; and selecting which projection device of the plurality of projection devices to project the image based on the detected position of the user. Further, the method can include: detecting the position of the user using one or more of: a camera, an ultrasonic sensor, and information received from a mobile device of the user that is communicatively coupled to the vehicle. The method may additionally include: selecting a first projection device of the plurality of projection devices to project the image; projecting the image using the selected first projection device; detecting a position of the user with respect to the vehicle; selecting a second projection device of the plurality of projection devices different from the first projection device to project the image based on the detected position of the user; and projecting the image using the selected second projection device. The plurality of projection devices may include at least two of: a first projection device disposed on a left side of the vehicle, a second projection device disposed on a right side of the vehicle, and a third projection device disposed on a rear side of the vehicle.

In addition, the method may further include: detecting an area surrounding the vehicle where projection of the image is restricted; and prohibiting projection of the image in the detected area. Similarly, the method may further include: detecting a presence of a pedestrian or another vehicle around the vehicle; and prohibiting projection of the image in an area corresponding to the detected pedestrian or detected vehicle.

The method may also include: detecting a position of the user with respect to the vehicle; controlling one or more display characteristics of the image based on the detected position of the user; and projecting the image according to the one or more controlled display characteristics. The one or more display characteristics may include one or more of: a projection angle, a projection orientation, a projection position, and a text attribute. In this regard, the method may further include: estimating a point of view of the user based on the detected position of the user; determining an orientation of the image which corresponds to the estimated point of view of the user; and projecting the image with the determined orientation. Also, the method may further include: changing the one or more display characteristics of the projected image in response to a change of the detected position of the user.

Furthermore, the detecting of whether the user has exited the vehicle may include: detecting whether a door of the vehicle has opened.

The method may also include deactivating the projection of the image. For instance, the method may include: deactivating the projection of the image when a predetermined amount of time elapses after detecting that the user has exited the vehicle. Also, the method may include: detecting a distance between the user and the vehicle; and deactivating the projection of the image when the detected distance is greater than a predetermined distance.

The projected image may include a map showing the current position of the vehicle and the destination and includes walking directions from the current position of the vehicle to the destination overlaid on the map.

Furthermore, in accordance with embodiments of the present disclosure, a system includes: at least one projection device equipped in a vehicle and configured to project an image; and a control unit equipped in the vehicle and configured to: receive an indication of a destination from a user, determine a route from a current position of the vehicle to the destination, detect whether the user has exited the vehicle, and control the at least one projection device so as to project an image of the route from the current position of the vehicle to the destination onto ground nearby the vehicle, such that the projected image is viewable by the user upon exiting the vehicle, in response to detecting that the user has exited the vehicle.

Furthermore, in accordance with embodiments of the present disclosure, a non-transitory computer readable medium contains program instructions executable by a control unit equipped in a vehicle, where the program instructions when executed cause the control unit to: receive an indication of a destination from a user; determine a route from a current position of the vehicle to the destination; detect whether the user has exited the vehicle; and project an image of the route from the current position of the vehicle to the destination onto ground nearby the vehicle using at least one projection device equipped in the vehicle, such that the projected image is viewable by the user upon exiting the vehicle, in response to detecting that the user has exited the vehicle.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
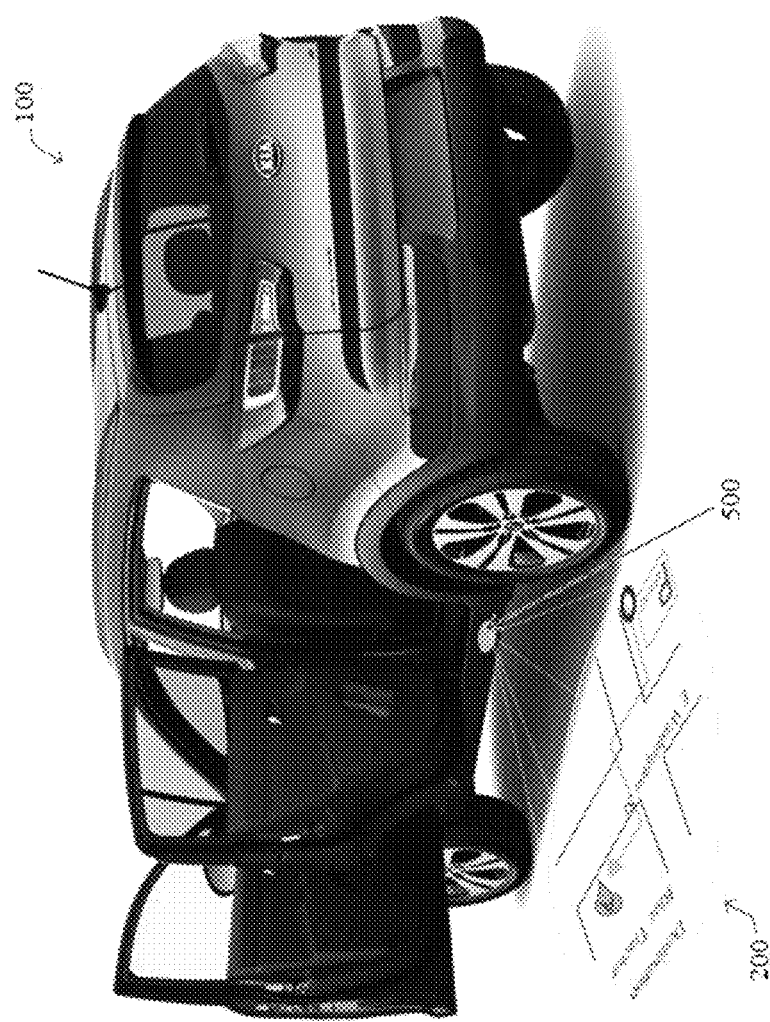
FIG. 1 illustrates an exemplary vehicle equipped with a projection system according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Additionally, it is understood that one or more of the below methods, or aspects thereof, may be executed by at least one control unit. The control unit may be implemented in a vehicle, as described herein. Indeed, an action that is performed by a control unit equipped in the vehicle may be described herein as performed by the vehicle itself for simplicity purposes. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the control unit in conjunction with one or more additional components, as described in detail below.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to embodiments of the present disclosure, the disclosed techniques utilize a series of one or more projection devices equipped in a vehicle capable of projecting an image onto ground nearby the vehicle. Once it is detected that a user exits the vehicle, a navigation system can be utilized to determine a route from a current position of the vehicle to a destination inputted by the user. Then, the projection device(s) can project an image of the route on the ground nearby the vehicle such that the image is readily viewable by the user upon egress of the vehicle. The image may include a map of the vehicle's current position and the destination with walking directions to the destination overlaid on the map, allowing the user to easily ascertain the optimal route to the destination from the vehicle.

FIG. 1 illustrates an exemplary vehicle equipped with a projection system according to embodiments of the present disclosure. As shown in FIG. 1, the vehicle 100 may include one or more projection devices 500 operable to project an image. The projection device 500 may be any suitable projection device known in the art. The image 200 projected by the projection device 500 may include a map showing a current position of the vehicle 100 and a destination selected by a user (e.g., driver or passenger), and may also include walking directions and/or public transit directions (if applicable or desired by the user) from the current position of the vehicle 100 to the destination overlaid on the map.

The one or more projection devices 500 may be equipped in the vehicle 100 in a manner which enables the devices to project an image 200 onto the ground nearby the vehicle 100. For instance, a projection device 500 may be disposed proximate to any vehicle door (e.g., at a rocker panel beneath a door, as shown in FIG. 1) to allow the user to view the projected image 200 immediately upon exiting the vehicle 100 through said door. It should be noted, however, that the positioning of the projection device 500 on the vehicle 100 shown in FIG. 1 is merely one of many possible arrangements. Further, the image 200 may be projected by the projection device 500 in a manner which allows for optimal readability by controlling display characteristics of the image 200, such as its angle, orientation, position, text attributes, and the like, based on a detected position and/or orientation of the user, as described in greater detail below.

Figure 2:
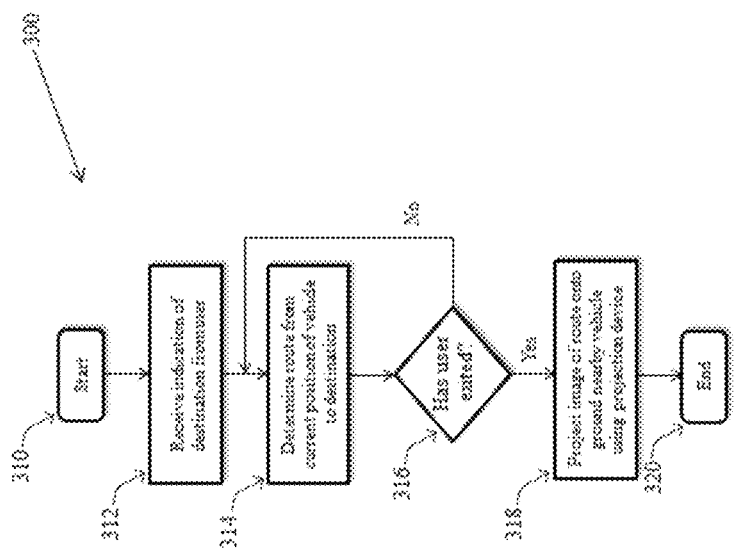
FIG. 2 illustrates an exemplary simplified procedure for operating a vehicle equipped with a projection system in accordance with embodiments of the present disclosure.

FIG. 2 illustrates an exemplary simplified procedure for operating a vehicle equipped with a projection system in accordance with embodiments of the present disclosure. The procedure 300 may start at step 310, and continue to step 312, where, as described in greater detail herein, an image 200 of a route from a current position of the vehicle 100 to a destination selected by a user can be projected by a projection device 500 equipped in the vehicle 100 upon the user exiting the vehicle 100, such that the projected image 200 is viewable by the user.

In step 312, an indication of a destination may be received from a user of the vehicle 100. The user may input his or her destination via any suitable means by which a control unit (not shown) of the vehicle 100 receives an indication of the destination, such as a navigation system equipped in the vehicle 100 or a mobile device of the user that is communicatively coupled to the vehicle 100, using a wireless (e.g., Bluetooth, wireless local area network (WLAN), Wi-Fi, infrared, etc.) or wired (e.g., universal serial bus (USB), etc.) connection.

In step 314, a route from a current position of the vehicle 100 to the inputted destination may be determined using any suitable navigation technique generally known in the art. For example, the control unit of the vehicle 100 may determine a route on the basis of acquired global position satellite (GPS) coordinates of the current position of the vehicle 100 and the destination, respectively, and digital maps stored locally in the vehicle 100 or stored on a remote server. Alternatively, a mobile device belonging to the user (not shown) may be leveraged by allowing the device to determine the route locally and transmit the determined route to the vehicle 100.

In step 316, it is detected whether the user has exited the vehicle 100. Such detection may be performed in a variety of ways. For example, the vehicle 100 can monitor whether a door of the vehicle 100 has opened. Upon detecting that a vehicle door has been opened, it may be assumed that the user has exited the vehicle 100. Additionally, or alternatively, cameras (e.g., around-view monitor (AVM) cameras), ultrasonic sensors, or the like mounted on the vehicle 100, or position data acquired by the user's mobile device and transmitted to the vehicle 100, may be utilized to determine whether the user is positioned outside of the vehicle 100. Such devices may also be used to determine a walking path of the user around the vehicle 100, as described in greater detail below. As another example, vehicle seat sensors may be used to determine that a user is no longer sitting in a seat, in which case it may be assumed that the user has exited the vehicle.

If it has been detected that the user has exited the vehicle 100, the procedure 300 continues to step 318 where an image 200 of the determined route can be projected onto the ground nearby the vehicle 100 using a projection device 500 equipped in the vehicle 100. The projection device 500 may be one of a plurality of projection devices equipped in the vehicle 100. By way of example, without limitation, the vehicle 100 may be equipped with a first projection device 500 disposed on a right side of the vehicle 100, a second projection device 500 disposed on a left side of the vehicle 100, and a third projection device 500 disposed on a rear side of the vehicle 100. Thus, the image 200 may be projected by a particular projection device 500 among several such devices 500 at a given time. Further, the particular projection device 500 responsible for projecting the image 200 at a given time can change according to a detected position of the user after exiting the vehicle 100, as described in greater detail below. Even further, the image 200 may be projected by the projection device 500 in a manner which allows for optimal readability by the user by controlling display characteristics of the image 200, such as its angle, orientation, position, text attributes, and the like, based on a detected position and/or orientation of the user, as also described in greater detail below.

On the other hand, if the user exiting the vehicle 100 has not been detected (i.e., the user is still inside the vehicle 100), the procedure 300 may illustratively return to step 314. The control unit of the vehicle 100 may continue to monitor whether the user has exited the vehicle 100, e.g., by detecting whether a vehicle door has opened, by analyzing images acquired by AVM cameras installed on the vehicle 100, by analyzing information measured by ultrasonic sensors installed on the vehicle 100, and the like.

The procedure 300 illustratively ends at step 320. The techniques by which the steps of procedure 300 may be performed, as well as ancillary procedures and parameters, are described in detail herein.

Figure 3:
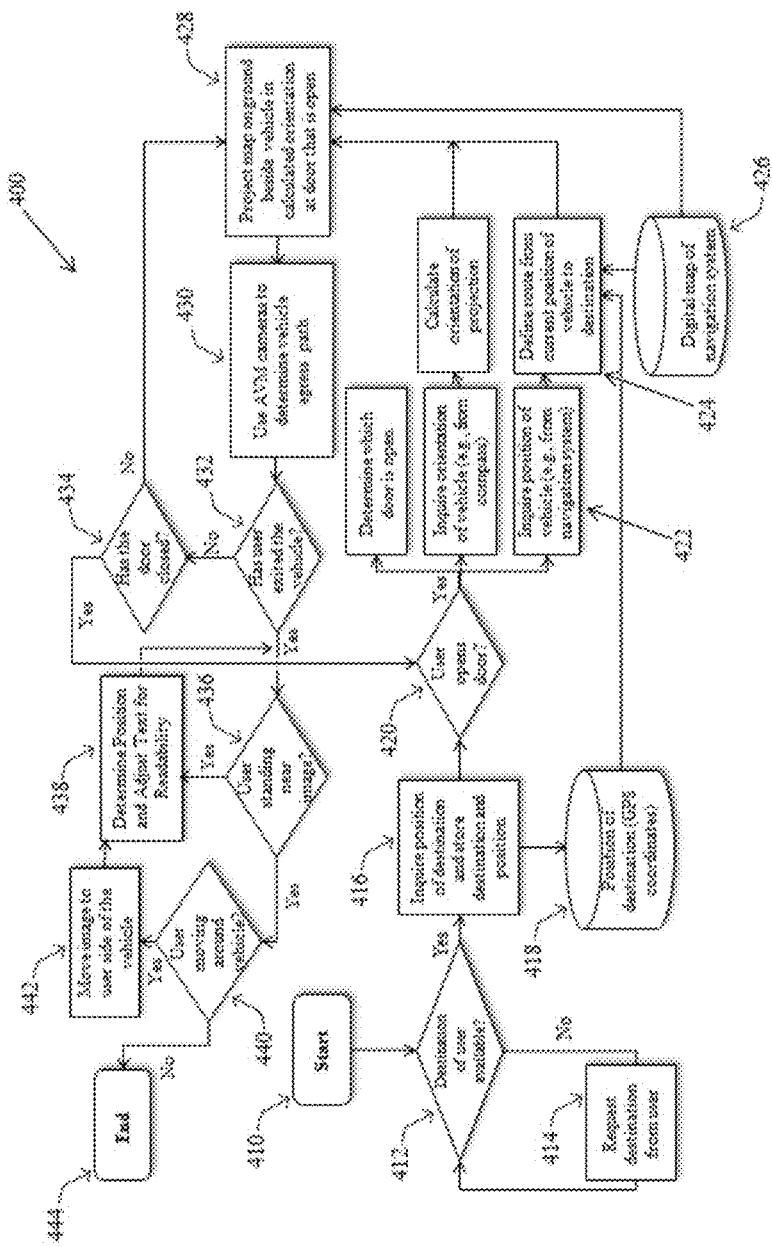
FIG. 3 illustrates an exemplary detailed procedure for operating a vehicle equipped with a projection system in accordance with embodiments of the present disclosure.

It should be noted that the steps shown in FIG. 2 are merely examples for illustration, and certain other steps may be included or excluded as desired (e.g., as shown in FIG. 3). Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

FIG. 3 illustrates an exemplary detailed procedure for operating a vehicle equipped with a projection system in accordance with embodiments of the present disclosure. The procedure 400 may start at step 410, and continue to step 412, where, as described in greater detail herein, an image 200 of a route from a current position of the vehicle 100 to a destination selected by a user can be projected by a projection device 500 equipped in the vehicle 100 upon the user exiting the vehicle 100, such that the projected image 200 is viewable by the user.

Initially, it can be determined whether a destination indicated by a user is available (step 412). If a destination has not yet been inputted by the user (e.g., via a navigation system equipped in the vehicle 100 or a mobile device of the user that is communicatively coupled to the vehicle 100), a request for a destination can be sent to the user (step 414). For instance, a notification can be sent to the user's mobile device requesting a destination, a prompt can be displayed on a navigation system screen equipped in the vehicle 100 requesting a destination, and so forth. When a destination has been received from the user, the vehicle 100 may determine the position of the destination (e.g., latitude and longitude) and store the destination and/or its determined position (step 416). To this end, the vehicle 100 may obtain the GPS position (i.e., GPS coordinates) of the destination by communicating with GPS satellites (step 418).

At step 420, it can be determined whether the user has exited the vehicle 100. In one implementation, the vehicle 100 may detect that a door of the vehicle 100 has opened. In such case, it can be determined that a user is exiting or has exited the vehicle 100 when a vehicle door has been opened. Alternatively, or additionally, it can be determined whether a user has exited the vehicle 100 using other techniques. For example, ultrasonic sensors equipped on the vehicle 100 can detect the presence of the user outside of the vehicle 100. As another example, AVM cameras equipped on the vehicle 100 can detect the presence of the user outside of the vehicle 100. As yet another example, location information can be obtained by the vehicle 100 from the mobile device of the user and analyzed by the vehicle 100 to determine that the user is outside of the vehicle 100. It should be understood, therefore, that various techniques for detecting that the user has exited the vehicle 100 are possible.

In response to detecting that the user has exited the vehicle 100, various steps can be performed to prepare for projection an image 200 of the route from the current position of the vehicle 100 to the destination. For instance, at step 422, the vehicle 100 can detect which door has been opened to determine which projection device 500 to activate for projecting the image 200 (if the vehicle 100 is equipped with a plurality of projection devices 500). Also, the vehicle 100 can determine its orientation (e.g., using an internal compass), which can be utilized to calculate the appropriate projection orientation/angle of the image 200 (step 424). In addition, the current position (i.e., GPS coordinates) of the vehicle 100 can be determined (e.g., using the vehicle's built-in navigation system).

Then, at step 424, a route from the current position of the vehicle 100 to the destination selected by the user can be calculated. For example, the control unit of the vehicle 100 may determine the route on the basis of the acquired global position satellite (GPS) coordinates of the current position of the vehicle 100 and the destination, respectively, and digital maps stored locally in the vehicle 100 or stored on a remote server (step 426). Alternatively, the mobile device belonging to the user may be leveraged by allowing the device to determine the route locally and transmit the determined route to the vehicle 100.

At step 428, a projection device 500 equipped on the vehicle 100 can project an image 200 of the calculated route from the current position of the vehicle to the user's destination onto ground nearby the vehicle 100, such that the projected image 200 is viewable by the user upon exiting the vehicle 100. The projected image 200 may include a map showing the current position of the vehicle 100 and the destination as well as walking directions from the current position of the vehicle 100 to the destination overlaid on the map.

As explained above, the vehicle 100 may be equipped with a plurality of projection devices 500. For instance, without limitation, the vehicle 100 may be equipped with a first projection device 500 disposed on a right side of the vehicle 100, a second projection device 500 disposed on a left side of the vehicle 100, and a third projection device 500 disposed on a rear side of the vehicle 100. Thus, depending on the position of the user, a projection device 500 closest to the user can be selected for projecting the image 200 of the route to the destination.

In this regard, after identifying which door of the vehicle 100 has opened (step 422), a projection device 500 among the plurality of projection devices 500 can be selected to project the image 200 based on the identified opened door. For instance, if a passenger-side door is opened, a projection device 500 on the passenger-side of the vehicle 100 can be selected to project the image 200.

Furthermore, the egress path of the user outside of the vehicle 100 can be monitored once the user has exited the vehicle (e.g., using one or more cameras equipped on the vehicle 100, using ultrasonic sensors, etc.). By doing so, the projection device 500 used for projecting the image 200 can change as the user's position around the vehicle 100 changes, such that the projected image 200 is easily viewable by the user even as the user is walking around the vehicle 100, as described in greater detail with respect to FIGS. 5A-5C.

Once it is confirmed that the user has exited the vehicle 100 (step 432), the vehicle 100 may determine whether the user is standing near the projected image 200 (step 436) or moving around the vehicle 100 (step 440). On the other hand, if the vehicle door has closed (step 436), indicating that the user is not exiting the vehicle 100 at the moment, the procedure 400 may return to step 420 where the vehicle 100 continues to monitor whether the user leaves the vehicle 100 (e.g., whether the vehicle door has re-opened).

If the user is standing near the projected image 200, the vehicle 100 may determine display characteristics for the projected image 200 for optimal readability (step 438). In this regard, the image 200 may be projected by the projection device 500 in a manner which allows for optimal readability by controlling display characteristics of the image 200, such as its angle, orientation, position, text attributes, and the like, based on the detected position and/or orientation of the user. For instance, images acquired by one or more cameras (not shown) disposed on the vehicle 100 can be analyzed to estimate a point of view of the user. Based on the estimated user point of view, an appropriate image orientation which allows the user to easily read the image 200 can be determined, and the projection device 500 can project the image 200 with the determined orientation.

If the user is moving around the vehicle 100, a different projection device 500 may be selected based on the updated position of the user (step 442). For instance, if the user exits the passenger-side of the vehicle 100 and the passenger-side projection device 500 is initially activated to project the image 200, and then the user walks around the rear of the vehicle 100, the projection device 500 which projects the image 200 may change to the rear-side projection device 500 so the user can continue to view the image 200 even as the user is moving. Similarly, an angle, orientation, or other display characteristics of the image 200 can be changed in response to detecting that the user is moving around the vehicle 100 in order to maintain optimal readability.

Projection of the image 200 may eventually end, e.g., after a predetermined period of time elapses, if the user moves beyond a predetermined distance from the vehicle 100, etc. Deactivation of the image 200 is described in greater detail with respect to FIGS. 8A and 8B.

The procedure 400 illustratively ends at step 444. The techniques by which the steps of procedure 400 may be performed, as well as ancillary procedures and parameters, are described in detail herein.

It should be noted that the steps shown in FIG. 3 are merely examples for illustration, and certain other steps may be included or excluded as desired (e.g., as shown in FIG. 2). Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 4B:
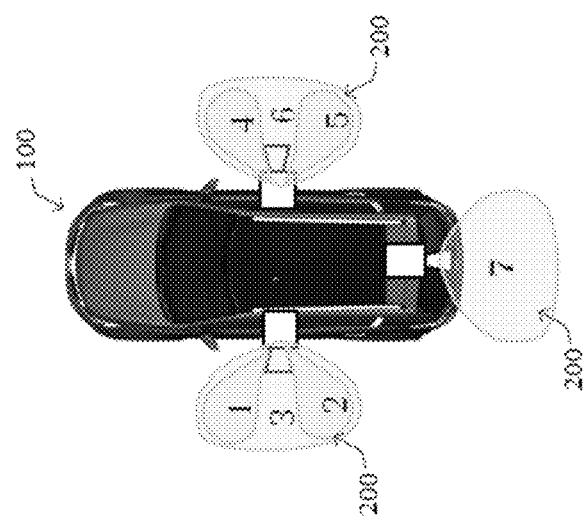
FIGS. 4A and 4B illustrate example image projection orientations of an exemplary vehicle equipped with a projection system according to embodiments of the present disclosure.
Figure 4A:
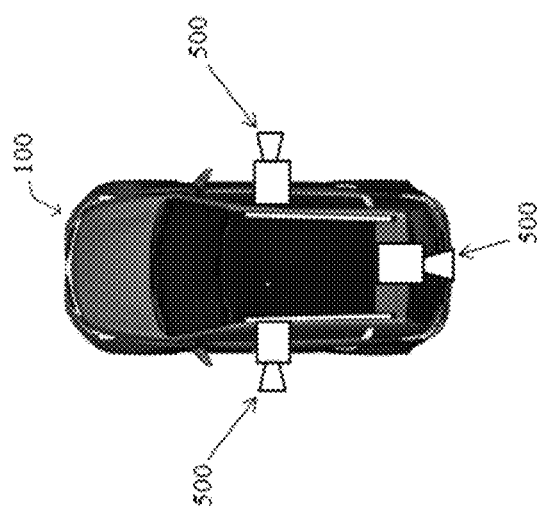

FIGS. 4A and 4B illustrate example image projection orientations of an exemplary vehicle equipped with a projection system according to embodiments of the present disclosure. As shown in FIG. 4A, the vehicle 100 may be equipped with multiple projection devices 500 at various positions on the vehicle 100. Each projection device 500 should be configured to project an image 200 onto ground nearby the vehicle 100 such that the image 200 is visible to the user upon exiting the vehicle 100. In general, activation of projection by the projection devices 500 may be triggered by the opening of a vehicle door (though other events which indicate the user has exited the vehicle 100, such as those described above, may also trigger activation of the projection of the projection devices 500). The control unit of the vehicle 100 may send an activation signal to a projection device 500 to activate the device and initiate projection of the image 200.

As shown in the example arrangement depicted in FIG. 4A, the vehicle 100 may be equipped with a first projection device 500 disposed on a right side of the vehicle 100, a second projection device 500 disposed on a left side of the vehicle 100, and a third projection device 500 disposed on a rear side of the vehicle 100. The projection devices 500 may be installed at various positions on the vehicle 100, such as a rocker panel adjacent to a door (as shown in FIG. 1), on a front or rear bumper, or the like. It should be understood that the arrangement of projection devices 500 shown in FIG. 4A is provided merely for demonstration purposes and does not limit the scope of the present disclosure thereto.

The projection devices 500 may be capable of projecting the image 200 of the route from the current position of the vehicle 100 to the destination selected by the user in various orientations (e.g., by adjusting the projection orientation, angle, position, direction, size, etc.). For example, as shown in FIG. 4B, the passenger-side and driver-side projection device 500, respectively, may be capable of projecting the image 200 of the route in three different orientations by controlling the display characteristics (e.g., angle, orientation, direction, size, etc.) of the projection.

Furthermore, the display characteristics of the image 200 can be controlled according to which vehicle door has been opened. For instance, if the user exits the vehicle from the rear driver-side door, the driver-side projection device 500 can set the appropriate display characteristics to project the image 200 according to orientation #2 in FIG. 4B. Similarly, when the user exits the vehicle 100, images of the user (e.g., acquired by one or more cameras equipped on the vehicle 100) can be analyzed to determine the user's point of view, and the display characteristics of the projected image 200 can be set accordingly. For instance, if the user exits the vehicle 100 from the passenger-side and is determined to be facing the rearwards, the passenger-side projection device 500 can set the appropriate display characteristics to project the image 200 according to orientation #5 in FIG. 4B. Alternatively, a projection device 500 may project the image 200 straightforwardly at a larger size, such as orientations #3, #6, and #7, which may be useful if the user is determined to be walking around the vehicle 100. It should be noted that the particular projection orientations depicted in FIG. 4B are provided merely for demonstration purposes, as the projection devices 500 are capable of projecting the image 200 in any suitable orientation(s).

Figures 5A, 5B, 5C:
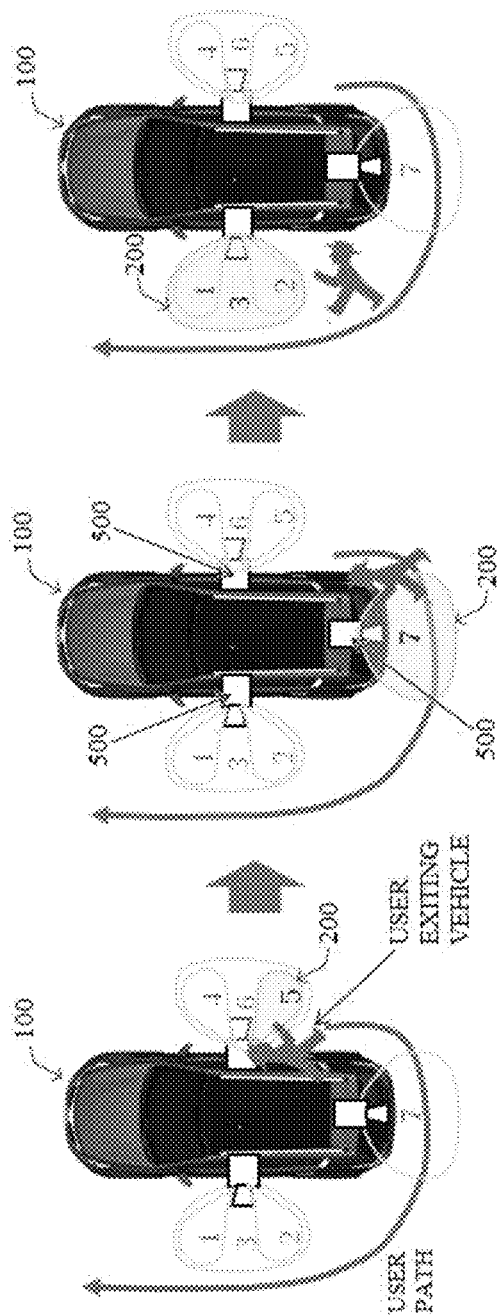
FIGS. 5A-5C illustrate an example scenario in which a user walks along a path around the exemplary vehicle equipped with a projection system according to embodiments of the present disclosure.

Additionally, when a user has exited the vehicle 100, causing the image 200 to be projected, the projection device 500 responsible for projecting the image 200 may change if the user's location is changing, e.g., when the user is walking around the vehicle 100. In this regard, FIGS. 5A-5C illustrate an example scenario in which a user walks along a path around the exemplary vehicle equipped with a projection system according to embodiments of the present disclosure. In FIG. 5A, a user exits the vehicle 100 from the rear passenger-side door, causing projection of the image 200 by the passenger-side projection device 500 according to orientation #5 (e.g., by appropriately setting the display characteristics of the projected image 200), such that the image 200 can be easily read by the user upon exiting the vehicle 100.

If the user begins to walk around the vehicle 100, as shown in FIG. 5B, the user's path may be detected using techniques described herein (e.g., one or more cameras installed on the vehicle 100, an ultrasonic sensor installed on the vehicle 100, information received from a mobile device of the user that is communicatively coupled to the vehicle 100, and the like). In response, the activated projection device 500 may change from the passenger-side projection device 500 to the rear projection device 500 as the user approaches the rear of the vehicle 100. This way, the user can maintain a substantially continuous view of the image 200 even as the position of the user is changing.

Then, as the user passes the rear of the vehicle 100 and approaches the driver-side of the vehicle 100, as shown in FIG. 5C, the activated projection device 500 may change from the rear projection device 500 to the driver-side projection device 500. The display characteristics of the projected image 200 can be controlled such that the image 200 is projected straightforwardly at a larger size, such as orientation #3, which may be read easily by the user even while the user is moving.

It should be noted that the scenario illustrated in FIGS. 5A-5C is provided for demonstration purposes only and should not be treated as limiting the scope of the present disclosure.

Figure 6B:
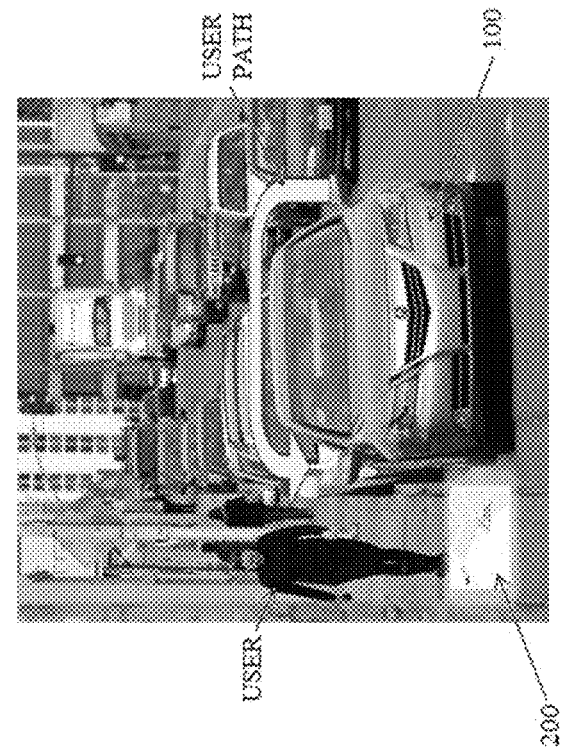
FIGS. 6A and 6B illustrate controlling image projection based on a user path around an exemplary vehicle equipped with a projection system according to embodiments of the present disclosure.
Figure 6A:
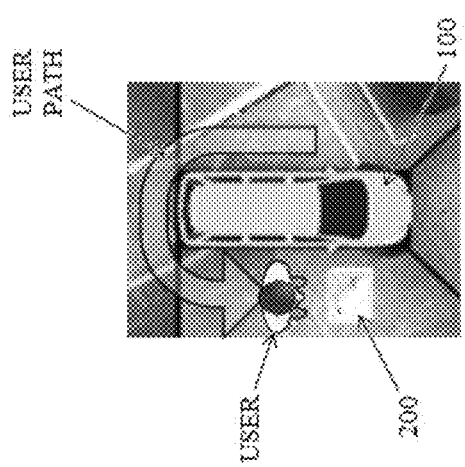

Along these same lines, FIGS. 6A and 6B illustrate controlling image projection based on a user path around an exemplary vehicle equipped with a projection system according to embodiments of the present disclosure. As shown in FIGS. 6A and 6B, a user may exit the vehicle 100 and walk to the other side of the vehicle 100 if, for example, the user exits on a side of the vehicle 100 that is closest to roadway traffic and prefers to walk around to the other side of the vehicle 100 where it is safer to read the map being projected. In such case, as described above, cameras (e.g., AVM cameras) mounted on the vehicle 100 can be used to analyze the user's path and determine whether the user has moved around to the other side of the vehicle 100. For instance, a series of photographs acquired by the vehicle's external camera system can be analyzed to determine the user's position with respect to the vehicle 100 and to determine whether the user is moving around the vehicle 100.

In response to determining that a user's position has changed after exiting the vehicle 100, projection of the image can be moved to the new position and display characteristics of the image 200 can be adjusted for optimal readability. When the user's position has changed, the control unit of the vehicle 100 may send an activation signal to the projection device 500 closest to the user. In addition, the standing position of the user will be analyzed (e.g., in the photographs acquired by the camera system) to determine user's point of view (POV) for the purpose of controlling projection display characteristics. For instance, the orientation of the map and any text in the projected image 200 can adjusted based on the user's POV so the user can discern information in the image 200 as easily as possible.

Figure 7A:
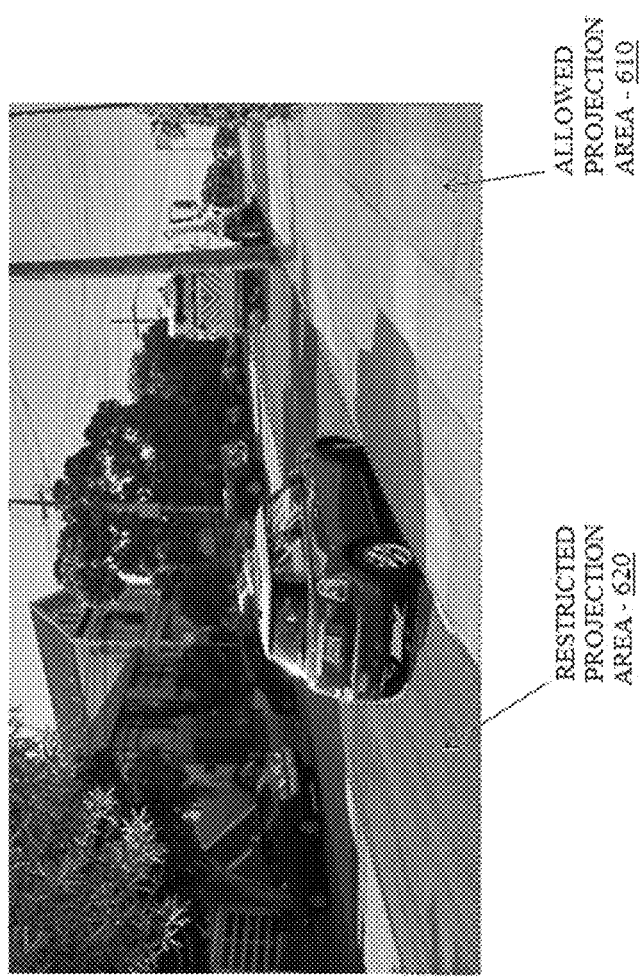
FIGS. 7A and 7B illustrate exemplary restricted projection areas according to embodiments of the present disclosure.
Figure 7B:
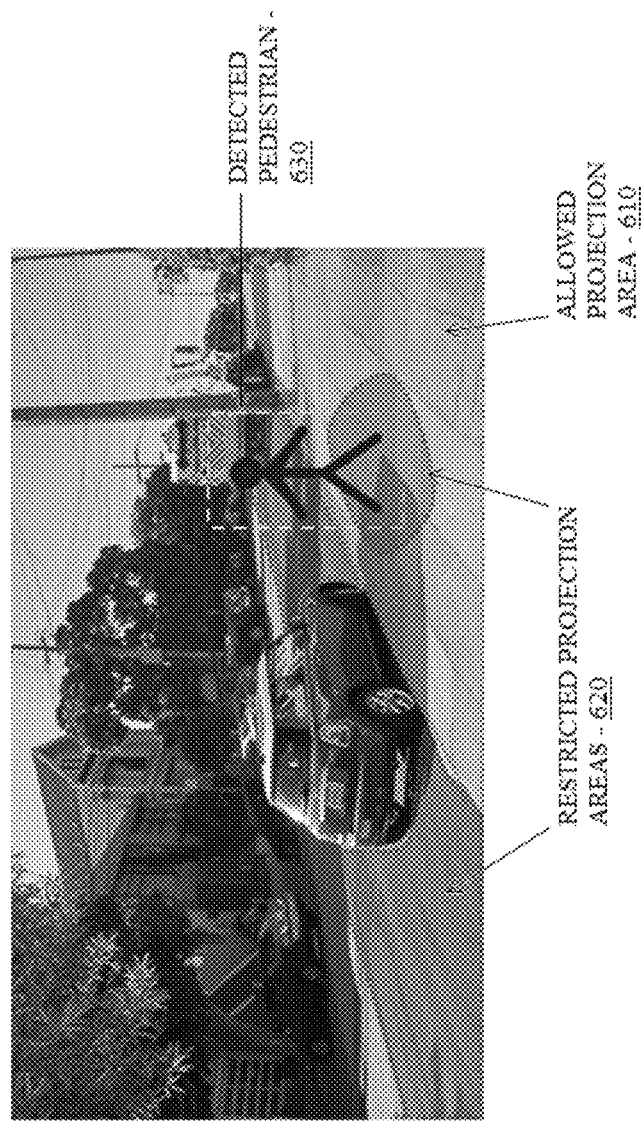

Meanwhile, in order to avoid certain hazardous situations and preserve the safety and security of the user as well as others, the projection system described herein may identify particular predefined conditions during exit of the vehicle 100 and restrict the projection accordingly. In this regard, FIGS. 7A and 7B illustrate exemplary restricted projection areas according to embodiments of the present disclosure. For instance, as shown in FIG. 7A, projection of the image 200 can be restricted in areas 620 where cyclists or other cars may be present (e.g., streets). Therefore, projection of the image 200 can be allowed only in areas 610 which are unimpeded by other traffic participants (e.g., sidewalks). The determination of which areas are blocked from projection (i.e., restricted projection areas 620) and which areas permit projection (i.e., allowed projection areas 610) may be performed using a map of the vehicle's navigation system (e.g., high definition maps) and the current position of the vehicle 100. Alternatively, projection can be restricted in the area 620, such as a road, only when a moving object (e.g., a vehicle, cyclist, etc.) is detected in said area. Restricting projection of the image 200 in areas where other traffic participants regularly travel can be helpful to avoid distracting those participants with projected images on the road.

In addition, projection of the image 200 can be controlled to preserve the privacy of the user. For instance, as shown in FIG. 7B, projection of the image 200 can be restricted in areas 620 where a pedestrian 630 (other than the user) is detected. Therefore, projection of the image 200 can be allowed only in areas 610 where a pedestrian 630 is not detected. Detection of pedestrians 630 can be performed using video cameras mounted on the vehicle 100 and object detection algorithms known in the art. Restricting projection of the image 200 in areas where a pedestrian 630 is present can be helpful to avoid disturbing or distracting nearby pedestrians and to avoid displaying potentially private destination information of the user to other pedestrians. Both of the projection restriction methods shown in FIGS. 6A and 6B can be combined or modified, and can be activated/deactivated by the user by controlling the system settings.

Figure 8A:
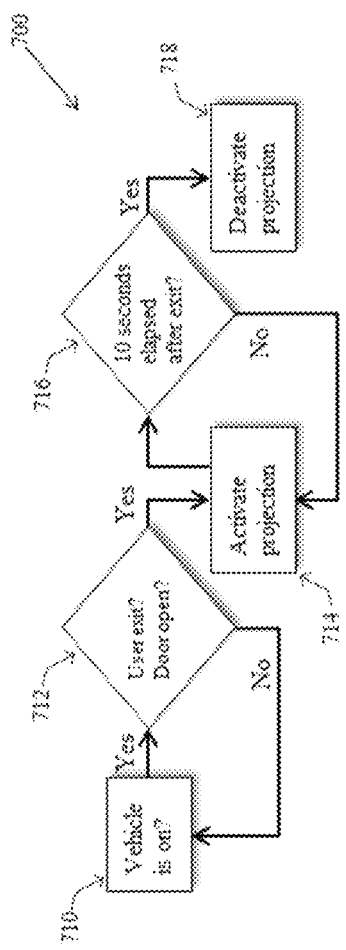
FIGS. 8A and 8B illustrate exemplary procedures for deactivating image projection.
Figure 8B:
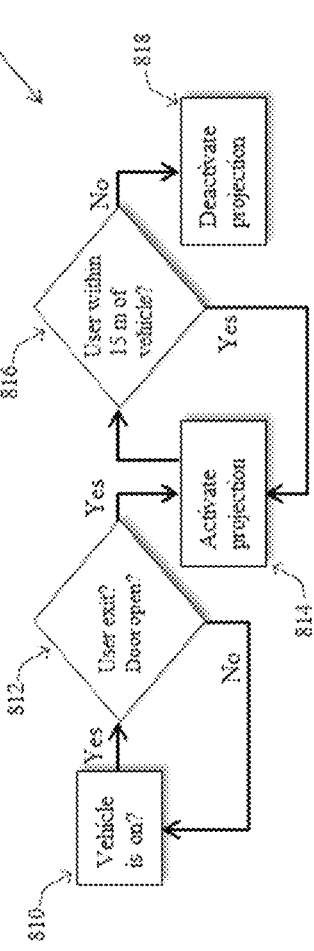

Furthermore, various techniques for power management of the projection system described herein can help to reduce unnecessary energy consumption. In this regard, FIGS. 8A and 8B illustrate exemplary procedures for deactivating projection of the image 200. In one example shown in FIG. 8A, the projection devices 500 equipped on the vehicle 100 can be deactivated after a predetermined amount of time has elapsed after the user has exited the vehicle 100. For instance, in procedure 700, if the vehicle 100 is on (step 710) and it is detected that a user has left the vehicle 100 (step 712), projection of an image 200 illustrating a route from the current position of the vehicle 100 to a destination selected by the user is activated (step 714). Then, it is determined whether a predetermined amount of time (e.g., 10 seconds) has elapsed after the user has exited the vehicle 100 (step 716). This step can be performed using a timer, for example. Once the predetermined amount of time has elapsed, projection of the image 200 can be deactivated (step 718).

Alternatively, or additionally, in another example shown in FIG. 8B, the projection devices 500 equipped on the vehicle 100 can be deactivated when the user has moved beyond a predetermined distance from the vehicle 100. For instance, in procedure 800, if the vehicle 100 is on (step 810) and it is detected that a user has left the vehicle 100 (step 812), projection of the image 200 is activated (step 814). Then, it is determined whether a user is within a predetermined range (e.g., 15 meters) of the vehicle 100 (step 816). This step can be performed using various mechanisms, such as cameras mounted on the vehicle 100, an ultrasonic sensor, a laser-based sensor (e.g., Lidar), current position acquired by the user's mobile device, and the like. Once the user has moved beyond the predetermined range, projection of the image 200 can be deactivated (step 818). Thus, as long as the user stays beside the vehicle 100, the projection remains on, and the projection is turned off once the user walks away.

The techniques by which the steps of procedures 700 and 800 may be performed, as well as ancillary procedures and parameters, are described in detail herein.

It should be noted that the steps shown in FIGS. 8A and 8B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified or combined in any suitable manner in accordance with the scope of the present claims.

Accordingly, techniques are described herein that provide a user of a vehicle with a visual representation of directions to a destination on the ground nearby the vehicle, such that the representation is viewable by the user upon exiting the vehicle. The visual representation is produced using one or more projection devices equipped in the vehicle capable of projecting an image onto the ground in response to detecting that the user has exited the vehicle. Display characteristics of the projected image may be automatically adjusted according to the detected position and/or orientation of the user, so information in the image is easily discernable. After being provided with directions to the user's selected destination upon exiting the vehicle, the user can find his or her way to the destination more quickly and reliably.

While there have been shown and described illustrative embodiments that provide for vehicular navigation systems utilizing a projection device, it is to be understood that various other adaptations and modifications may be made within the spirit and scope of the embodiments herein. Therefore, the embodiments of the present disclosure may be modified in a suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving an indication of a destination from a user;
determining a route from a current position of a vehicle to the destination;
detecting whether the user has exited the vehicle; and
projecting an image of the route from the current position of the vehicle to the destination onto ground nearby the vehicle using a projection device equipped in the vehicle, such that the projected image is viewable by the user upon exiting the vehicle, in response to detecting that the user has exited the vehicle.

2. The method of claim 1, further comprising:
receiving the indication of the destination from the user via a navigation system equipped in the vehicle or a mobile device of the user that is communicatively coupled to the vehicle.

3. The method of claim 1, wherein the projection device is one of a plurality of projection devices equipped in the vehicle.

4. The method of claim 3, further comprising:
selecting which projection device of the plurality of projection devices to project the image; and
projecting the image using the selected projection device.

5. The method of claim 4, further comprising:
identifying which door of a plurality of doors of the vehicle has opened; and
selecting which projection device of the plurality of projection devices to project the image based on the identified opened door.

6. The method of claim 4, further comprising:
detecting a position of the user with respect to the vehicle; and
selecting which projection device of the plurality of projection devices to project the image based on the detected position of the user.

7. The method of claim 6, further comprising:
detecting the position of the user using one or more of: a camera, an ultrasonic sensor, and information received from a mobile device of the user that is communicatively coupled to the vehicle.

8. The method of claim 4, further comprising:
selecting a first projection device of the plurality of projection devices to project the image;
projecting the image using the selected first projection device;
detecting a position of the user with respect to the vehicle;
selecting a second projection device of the plurality of projection devices different from the first projection device to project the image based on the detected position of the user; and
projecting the image using the selected second projection device.

9. The method of claim 3, wherein the plurality of projection devices includes at least two of: a first projection device disposed on a left side of the vehicle, a second projection device disposed on a right side of the vehicle, and a third projection device disposed on a rear side of the vehicle.

10. The method of claim 1, further comprising:
detecting an area surrounding the vehicle where projection of the image is restricted; and
prohibiting projection of the image in the detected area.

11. The method of claim 1, further comprising:
detecting a presence of a pedestrian or another vehicle around the vehicle; and
prohibiting projection of the image in an area corresponding to the detected pedestrian or detected vehicle.

12. The method of claim 1, further comprising:
controlling one or more display characteristics of the image; and
projecting the image according to the one or more controlled display characteristics,
wherein the one or more display characteristics includes one or more of: a projection angle, a projection orientation, a projection position, a projection direction, and a text attribute.

13. The method of claim 12, further comprising:
estimating a point of view of the user based on an acquired image of the user;
determining an orientation of the image which corresponds to the estimated point of view of the user; and
projecting the image with the determined orientation.

14. The method of claim 12, further comprising:
changing the one or more display characteristics of the projected image in response to a change of a detected position of the user.

15. The method of claim 1, wherein the detecting of whether the user has exited the vehicle comprises:
detecting whether a door of the vehicle has opened.

16. The method of claim 1, further comprising:
deactivating the projection of the image when a predetermined amount of time elapses after detecting that the user has exited the vehicle.

17. The method of claim 1, further comprising:
detecting a distance between the user and the vehicle; and
deactivating the projection of the image when the detected distance is greater than a predetermined distance.

18. The method of claim 1, wherein the projected image includes a map showing the current position of the vehicle and the destination and includes walking directions from the current position of the vehicle to the destination overlaid on the map.

19. A system comprising:
at least one projection device equipped in a vehicle and configured to project an image; and
a control unit equipped in the vehicle and configured to:
receive an indication of a destination from a user, determine a route from a current position of the vehicle to the destination, detect whether the user has exited the vehicle, and control the at least one projection device so as to project an image of the route from the current position of the vehicle to the destination onto ground nearby the vehicle, such that the projected image is viewable by the user upon exiting the vehicle, in response to detecting that the user has exited the vehicle.

20. A non-transitory computer readable medium containing program instructions executable by a control unit equipped in a vehicle, wherein the program instructions when executed cause the control unit to:

receive an indication of a destination from a user;

determine a route from a current position of the vehicle to the destination;

detect whether the user has exited the vehicle; and project an image of the route from the current position of the vehicle to the destination onto ground nearby the vehicle using at least one projection device equipped in the vehicle, such that the projected image is viewable by the user upon exiting the vehicle, in response to detecting that the user has exited the vehicle.

* * * * *